(12) United States Patent
Im (10) Patent No.: US 7,448,872 B2
(45) Date of Patent: Nov. 11, 2008

(54) PORTABLE TERMINAL HAVING DISPLAY UNIT CRADLED ON A SLANT

(75) Inventor: Jin-Man Im, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/728,975

(22) Filed: Mar. 27, 2007

(65) Prior Publication Data
US 2007/0243731 A1   Oct. 18, 2007

(30) Foreign Application Priority Data
Apr. 7, 2006   (KR) ...................... 10-2006-0031942

(51) Int. Cl.
*H01R 39/00* (2006.01)
(52) U.S. Cl. ...................................................... 439/10
(58) Field of Classification Search .................. 439/10, 439/31, 32, 131; 455/550.1, 575.1, 575.4; 361/749; 345/169
See application file for complete search history.

(56) References Cited

U.S. PATENT DOCUMENTS 5,841,635 A * 11/1998 Sadler et al. ................ 361/749
2003/0090468 A1 * 5/2003 Finke-Anlauff ............. 345/169
2005/0044665 A1   3/2005 Kuramochi
2005/0068337 A1   3/2005 Duarte et al.
2005/0107137 A1 * 5/2005 Byun et al. ............... 455/575.1
2006/0073859 A1   4/2006 Chou
2007/0082695 A1 * 4/2007 Yoon et al. ............... 455/550.1
2007/0105606 A1 * 5/2007 Yoon et al. ............... 455/575.4
2007/0287307 A1 * 12/2007 Park .......................... 439/131

FOREIGN PATENT DOCUMENTS

EP            1 312 999 A2    5/2003
WO          WO 00/38332       6/2000

* cited by examiner

*Primary Examiner*—Chandrika Prasad
(74) *Attorney, Agent, or Firm*—The Farrell Law Firm, PC (57) ABSTRACT

Disclosed is a portable terminal and a sliding type cradle for the same, by which a user can conveniently view images. The portable terminal includes a first housing having a recess formed at a desired depth on an upper surface of the first housing, and including at least one speaker unit and a plurality of keys; and a second housing including a display unit, and sliding while facing the first housing and automatically rotating at the location where the sliding movement terminates so that the display unit is slantingly cradled.

18 Claims, 14 Drawing Sheets

PORTABLE TERMINAL HAVING DISPLAY UNIT CRADLED ON A SLANT

PRIORITY

This application claims priority to an application entitled "Portable Terminal and Sliding Type Cradle For the Same" filed with the Korean Intellectual Property Office on Apr. 7, 2006 and assigned Serial No. 2006-31942, the contents of which are incorporated herein by reference.

BACKGROUND OF THE INVENTION

1. Field of the Invention

The present invention relates generally to a portable terminal including Digital Multimedia Broadcasting phones (DMB phones), game phones, chatting phones, camera phones, MP3 phones, Personal Communication System (PCS), Personal Digital Assistants (PDAs), Hand Held Phones, etc., and in particular, to a portable terminal and a sliding type cradle for the same, which provides an environment in which a user can conveniently view a screen thereof.

2. Description of the Related Art

In general, a "portable terminal" refers to an electronic device which a user can carry for wirelessly communicating with another user. In consideration of portability, design of such a portable terminal has tended towards compactness, slimness and lightness, as well as towards providing multimedia capabilities to allow a user to pursue a wider variety of functions. Future portable terminals will used for various functions while still being compact and lightweight and will also be modified to be suitable for functioning in a multimedia environment and for providing Internet access and functions. Additionally, such portable terminals can be used by people anywhere in the world.

Conventional portable terminals can be classified into various types according to their appearance, such as bar-type portable terminals, flip-type portable terminals, and folder-type portable terminals. The bar-type portable terminal has a single housing shaped like a bar. The flip-type portable terminal has a flip panel which is pivotably mounted to a bar-shaped housing by a hinge unit. The folder-type portable terminal has a folder coupled to a single bar-shaped housing by a hinge unit in such a manner that the folder can be rotated in order to be folded or unfolded from the housing.

Further, portable terminals can be classified as neck wearable type terminals and wrist wearable type terminals, according to the position at or the way in which a user wears the terminal. The neck wearable type terminal is one which a user wears around the neck using a lanyard or necklace, while the wrist wearable type terminal is one which a user wears around the wrist.

Additionally, portable terminals can be classified as rotation-type terminals and sliding-type terminals according to the methods of opening and closing the terminals. In the rotation-type portable terminal, two housings are coupled to each other in a manner that one housing rotates to be opened or closed relative to the other while facing each other. In the sliding-type portable terminal, two housings are coupled to each other in a manner that one housing slides to be opened or closed relative to the other. The various classifications of portable terminals are easily understood by those skilled in the art.

Further, each of the conventional portable terminals is now capable of allowing a voice communication as well as a high-speed data communication. That is, as consumer demands have increased, various services have been provided using wireless communication technology for transmitting and receiving data at a high speed.

Presently a camera lens tends to be is mounted to the portable terminal for which it is possible to transmit image signals and the like. Present portable terminals are equipped with an embedded or external camera lens module. Consequently, it is possible to perform image communication with a desired partner or to photograph a desired subject.

However, the conventional portable terminal has the following problems. In order for a user to conveniently view data displayed on a display unit, a separate cradle is required which is not cost effective to the user. It is convenient for a user to view information displayed on a display unit in a state that the display unit is slantingly positioned. As a result, a user grips and slants the portable terminal with his/her hands so as to view the displayed data, unless the conventional portable terminal is slantingly supported by using a separate cradle. Further, it is actually inconvenient for a user to view data displayed on the display unit which is located on a desk without the separate cradle.

Since the user holds the portable terminal with one hand while pushing buttons, in the case of using another function, i.e. game function, etc., excluding function of displaying TV through the portable terminal, it is inconvenient for the user to use the game function.

Further, since the conventional portable terminal has a structure in that the user views information using the display unit in the state that two housings face each other, there is an increase in thickness and the volume of the portable terminal. This further results in an increase in the numbers of the parts for the miniaturization of the portable terminal, thereby making it difficult to assemble and mount the parts, and thus inhibiting the further miniaturization of the portable terminal and making it difficult to commercialize same.

SUMMARY OF THE INVENTION

The present invention has been made in view of the above-mentioned problems occurring in the conventional art, and it is an object of the present invention is to provide a portable terminal and a sliding type cradle for the same, in which a display unit located in a space formed by recessing a portion of a housing of the portable terminal can be slid and automatically rotated to stand at a predetermined angle, so that a viewer can set the portable terminal on the cradle and easily view TV programs and moving pictures.

Another object of the present invention is to provide a portable terminal and a sliding type cradle for the same, in which a display unit seated in a space formed by recessing a portion of a housing of the portable terminal can be slid and automatically rotated to stand at a predetermined angle, thereby reducing the number of parts for improving the workability and reducing the mounting space, while still reducing the size and volume of the portable terminal so as to miniaturize same.

In order to accomplish these objects, there is provided a portable terminal having a first housing which has a recess formed at a desired depth on an upper surface of the first housing, and including at least one speaker unit and a plurality of keys; and a second housing including a display unit, and sliding while facing the first housing and automatically rotating at a location where the sliding movement is completed so that the display unit is slantingly cradled.

In order to accomplish these objects, there is provided a sliding type cradle for a portable terminal having a first housing, and a second housing which slides on the first housing and then is slantingly cradled with respect to the first housing, which has a first member mounted in a recess formed at a desired depth in the first housing; a second member coupled to the second housing; a sliding guide disposed between the first and second members, for guiding a sliding movement of the second housing; and hinge means disposed between the first member upon completion of and the sliding guide, for automatically rotating the second member and the sliding guide around a hinge axis in a direction of being apart from the first member the sliding movement of the second housing.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Figure 1:
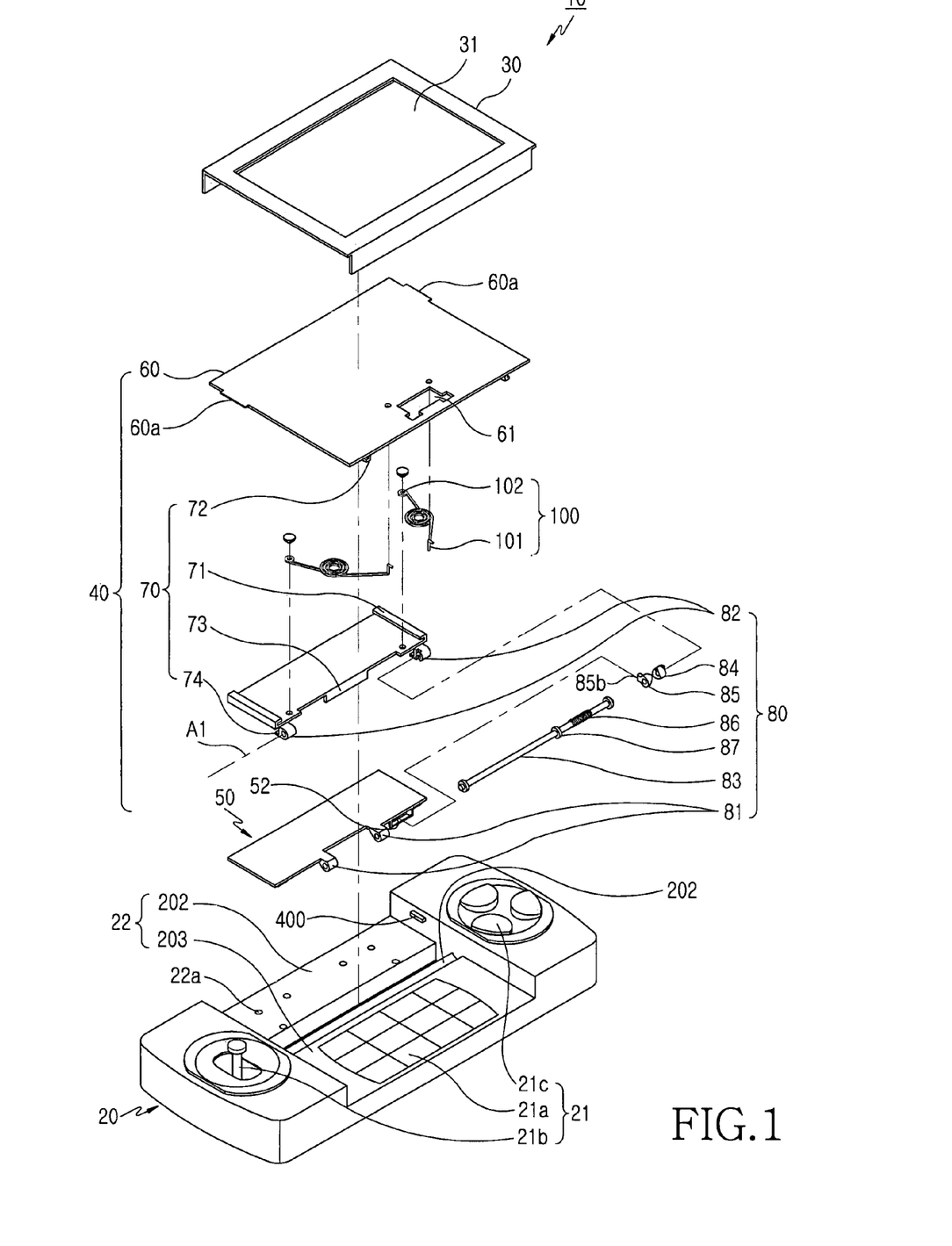
FIG. 1 is an exploded perspective view showing the structure of a portable terminal and a sliding type cradle for the same according to the present invention.
Figure 2:
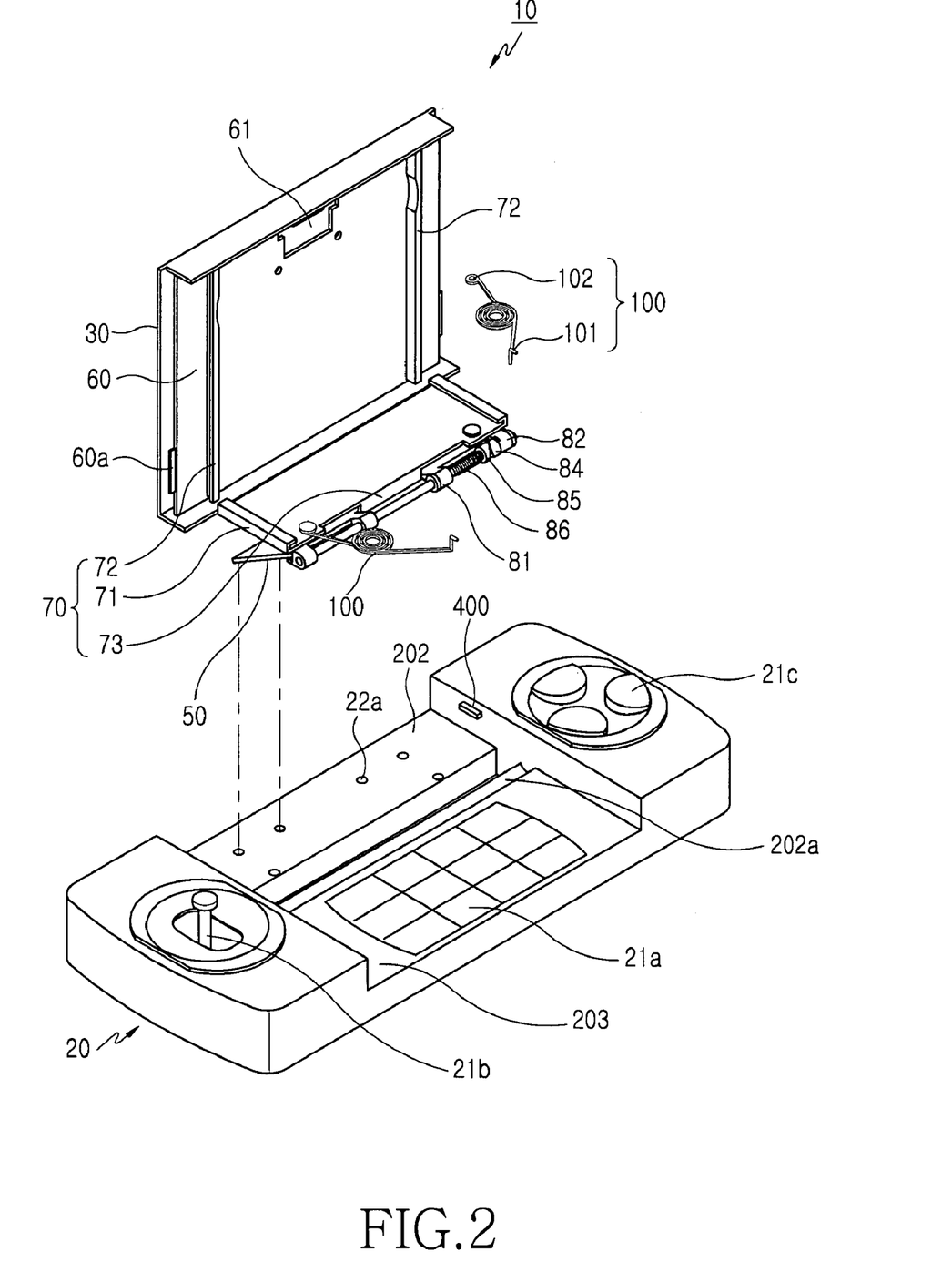
FIG. 2 is a perspective view showing the portable terminal and the sliding type cradle for the same according to the present invention in an assembled state.

Hereinafter, preferred embodiments of the present invention will in be described in detail with reference to the annexed drawings. In the drawings, the same or similar elements are denoted by the same reference numerals even though they are depicted in different drawings. In the following description, a detailed description of known functions and configurations incorporated herein has been omitted for conciseness As shown in FIGS. 1 and 2, the portable terminal 10 includes a first housing 20 and a second housing 30. The first housing 20 includes at least one speaker unit (not shown) and a plurality of keys 21. Further, the first housing 20 has a recess formed in a desired depth on an upper surface thereof. The second housing 30 includes a display unit 31, which is mounted in the recess of the first housing 20 and slides so as to open and close a plurality of keys 21a while facing the first housing 20. The second housing 30 automatically rotates at the location where the sliding movement thereof terminates, so as to raise the display unit 31 to a desired angle.

Figure 3:
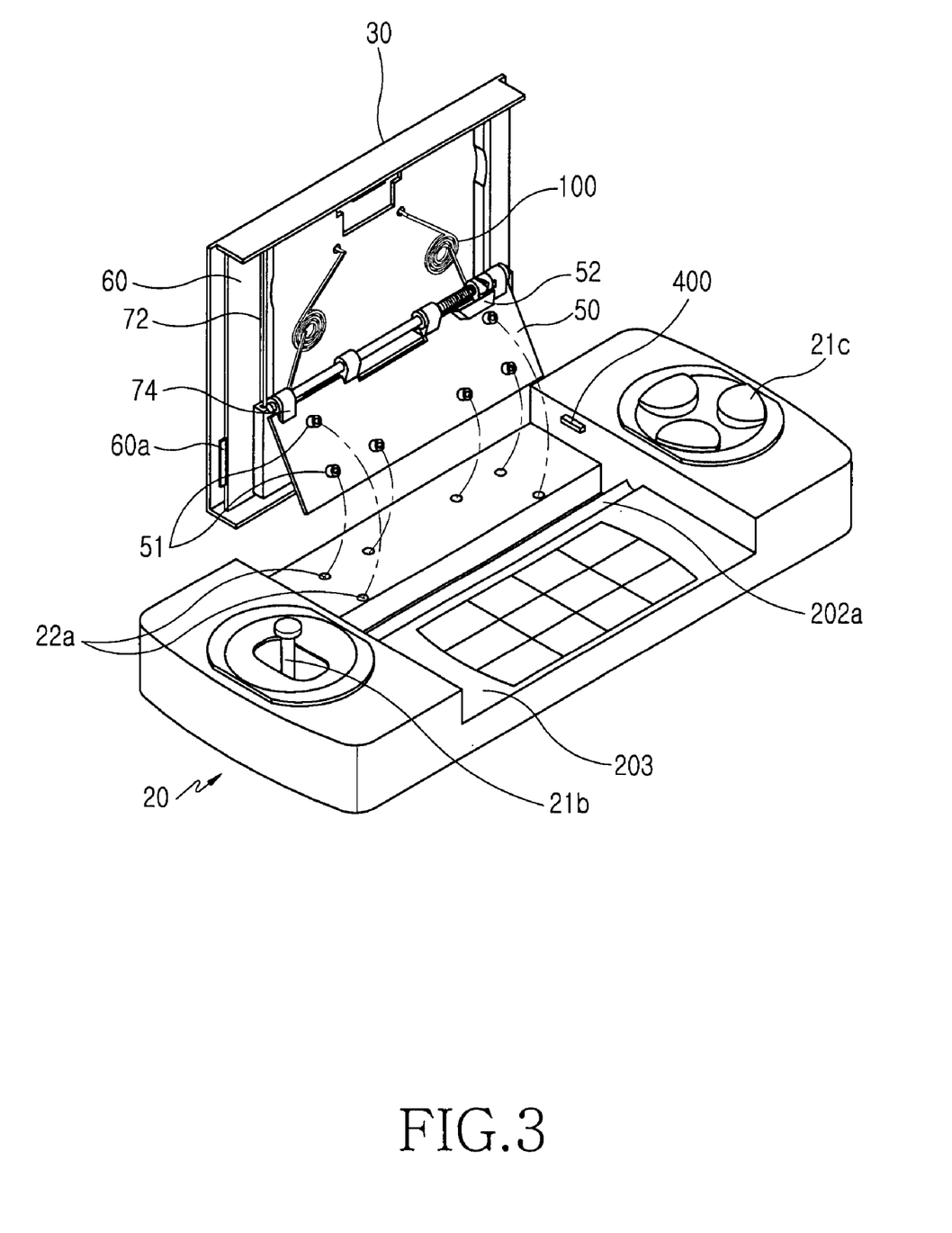
FIG. 3 is a perspective view showing the portable terminal and the sliding type cradle for the same according to the present invention in an assembled state.
Figure 4:
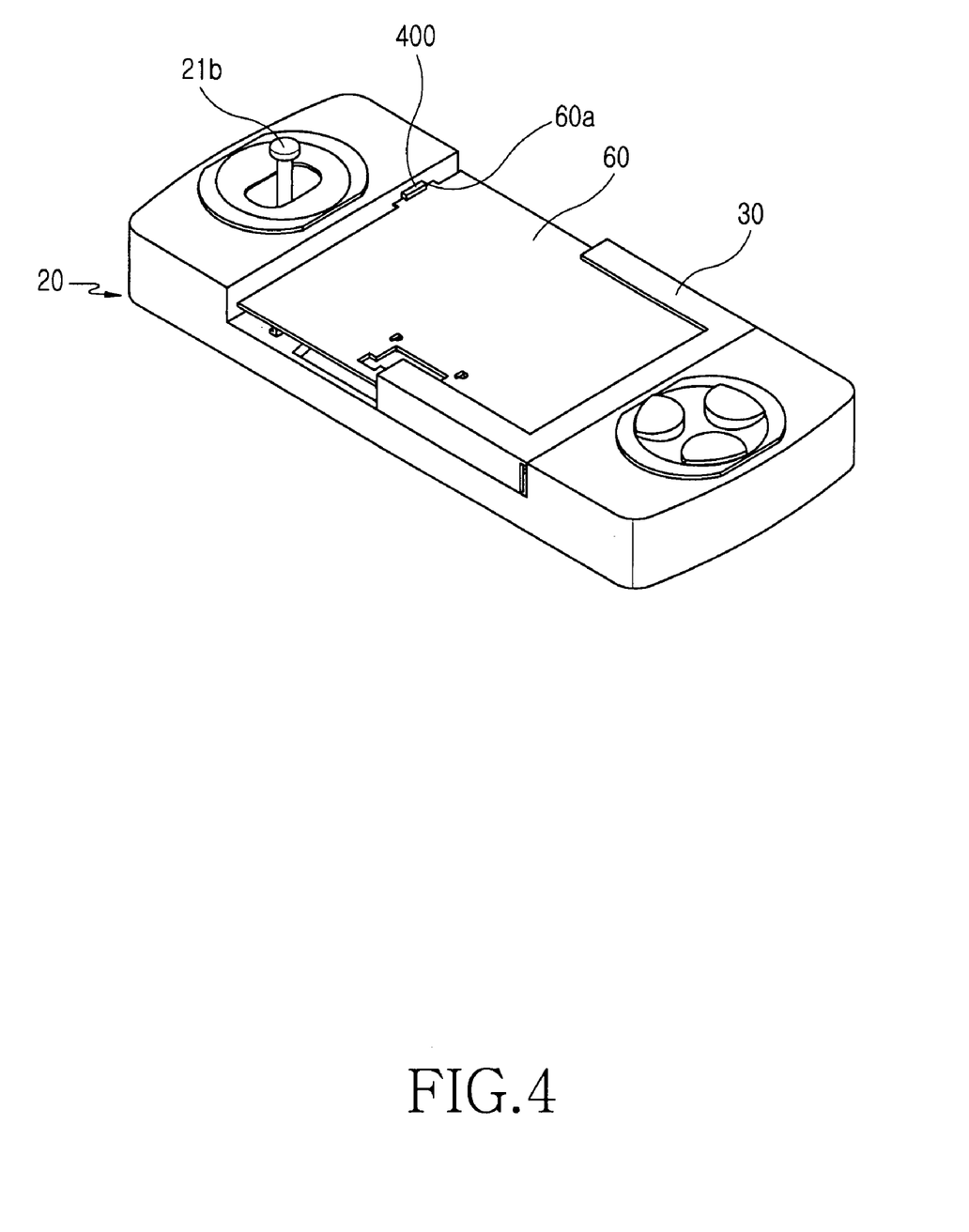
FIG. 4 is a perspective view showing the portable terminal and the sliding type cradle for the same according to the present invention, after assembly has been completed.
Figure 5:
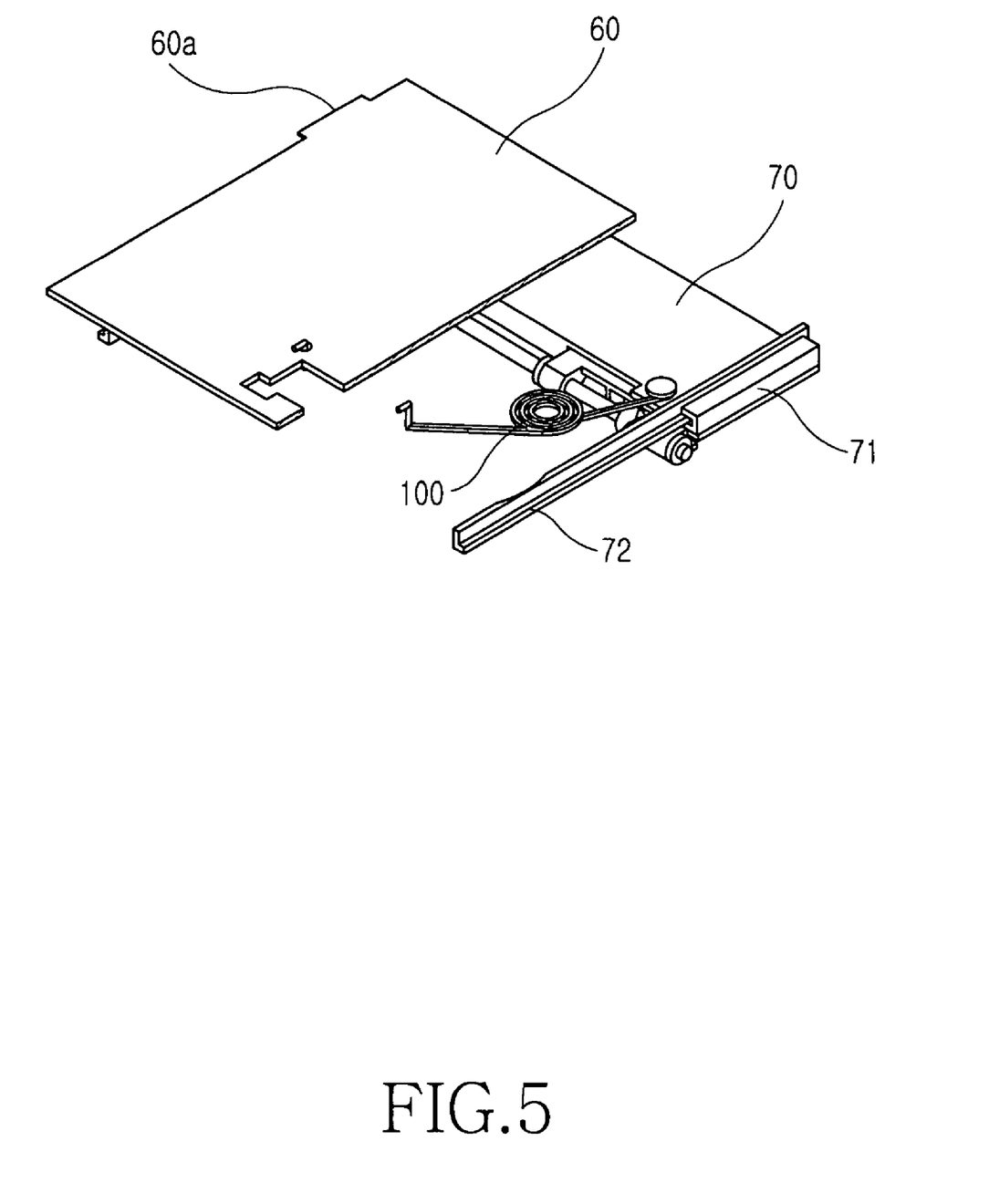
FIG. 5 is a perspective view showing the sliding type cradle according to the present invention.

As shown in FIGS. 3 and 4, the first housing 20 has a mounting surface 22 recessed at a desired depth in order to mount the second housing 30 so as to face the first housing 20. The keys 21 include first, second, and third keys 21a, 21b, and 21c. The first keys 21a are arranged on the mounting surface 22, while the second and third keys 21b and 21c are arranged beside the mounting surface 22. The first keys 21a are arranged in 3×4 matrices. The second keys 21b include joystick keys. The third keys 21c are used as game keys.

As shown in FIGS. 1 to 5, the sliding type cradle 40 of the portable terminal includes first and second members 50 and 60, a sliding guide 70, and a hinge member 80. The first member 50 is coupled to the mounting surface 22 formed at a desired depth in the first housing so as to face the sliding guide 70. The second member 60 is coupled to the second housing 30 so as to slide along with the sliding guide as describe below. The sliding guide 70 is disposed between the first and second members 50 and 60 in order to guide the sliding movement of the second housing. The hinge member 80 is disposed between the first member and the sliding guide 70 so as to automatically rotate the second member 60 and the sliding guide 70 around a hinge axis A1 in a direction of being apart from the first housing while the second housing slides.

As shown in FIGS. 2 and 3, a force supply member 100 is disposed between the second member 60 and the sliding guide 70. The force supply member 100 applies a force for closing the second member 60 within a predetermined distance while applying a force for opening the second member 60 after moving beyond the predetermined distance. The force supply member 100 includes an elastic body, one end 101 of which is fixedly coupled to the sliding guide 70 by means of screws while the other end 102 thereof is inserted into the hole formed in the second member 60 and moves along a constant orbit when the second housing 30 slides.

As shown in FIG. 3, the mounting surface 22 of the first housing 20 is divided into the first and second regions 202 and 203. The first region 202 has a plurality of screw coupling members 22a coupled to a plurality of screw holes 51 formed in the first member 50. The second region 203 includes a plurality of first keys 21a which is closed and opened as the second housing 30 slides. The first member 50 has a plurality of screw holes 51 formed on a surface thereof, which is screwed to the screw coupling member 22a.

Figure 8:
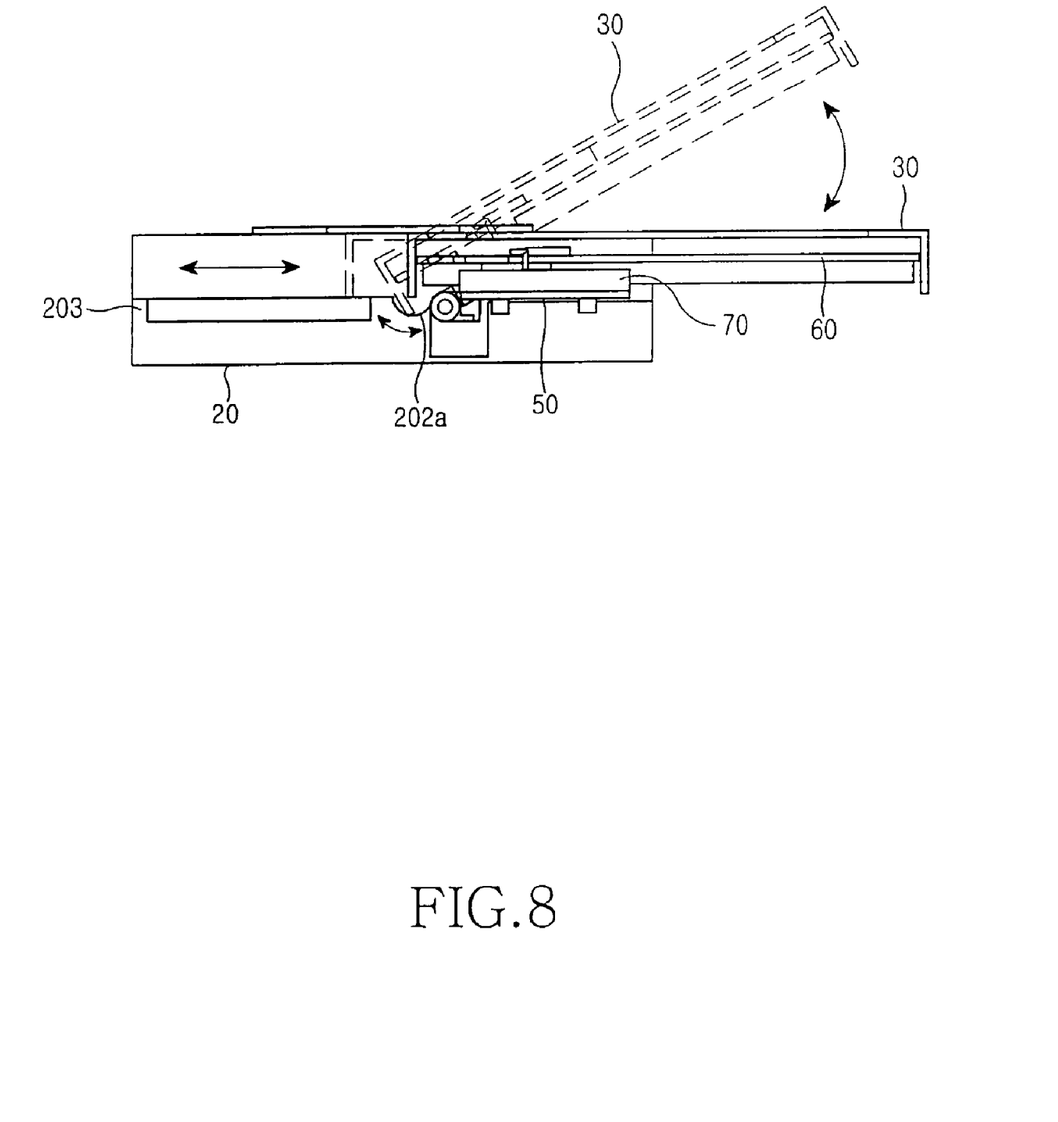
FIG. 8 is a sectional view showing the portable terminal and the sliding type cradle for the same after the sliding and rotating of the second housing according to the present invention.

As shown in FIGS. 3 and 8, the second region 203 protrudes over the first region 202 so as to form a step portion, while the first region 202 has a guide rotation groove 202a formed therein so as to guide the second housing 30 so that the second housing 30 automatically rotates at a location where the second housing 30 finishes its sliding movement.

As shown in FIG. 1, the second member 60 has an opening 61 for a flexible circuit formed therein so that the flexible circuit (not shown) provided to the second housing 30 extends through the opening 61 and is connected to the first housing 20.

Figure 6:
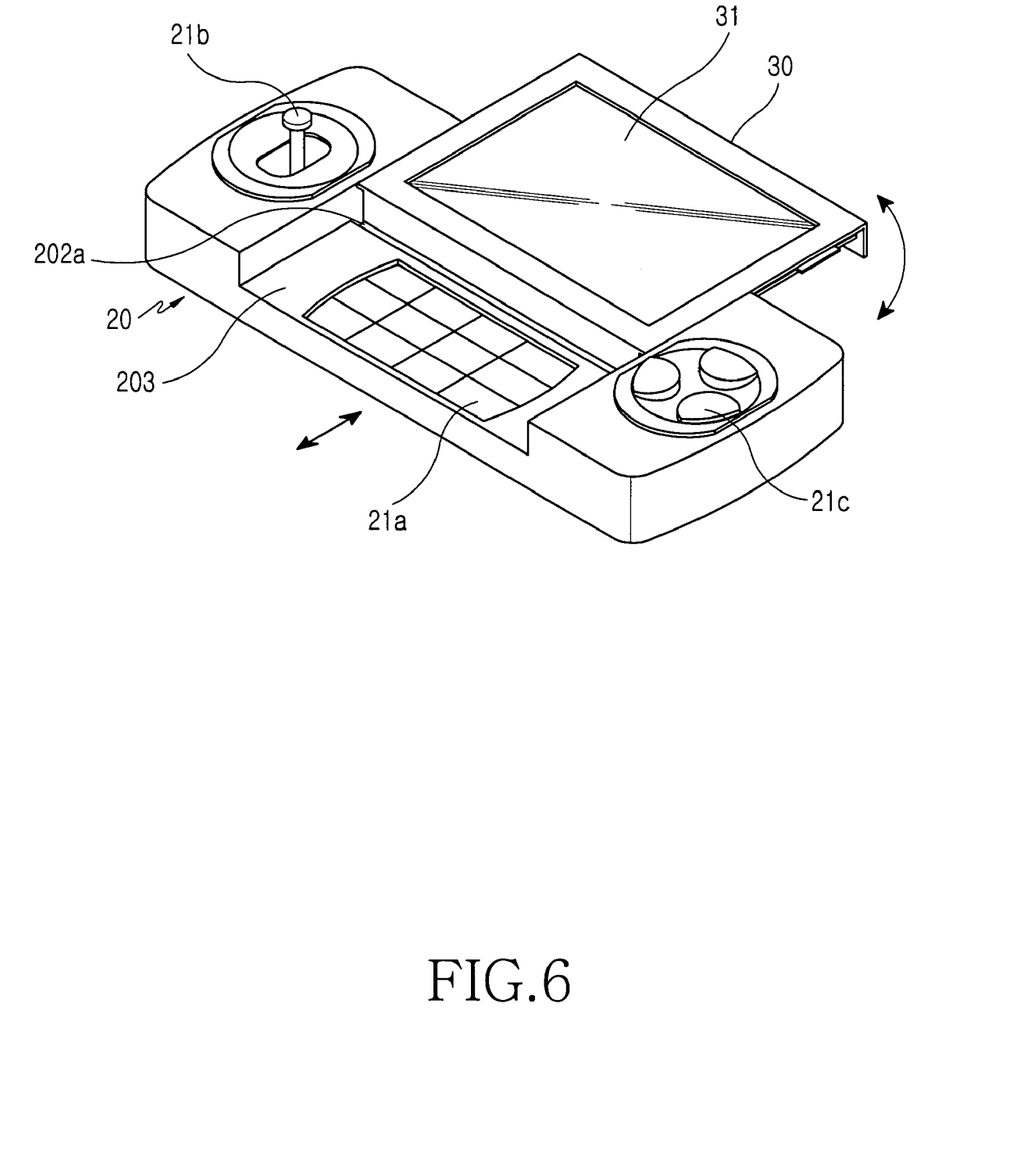
FIG. 6 is a perspective view showing the portable terminal and the sliding type cradle for the same after the sliding of a second housing according to the present invention
Figure 7:
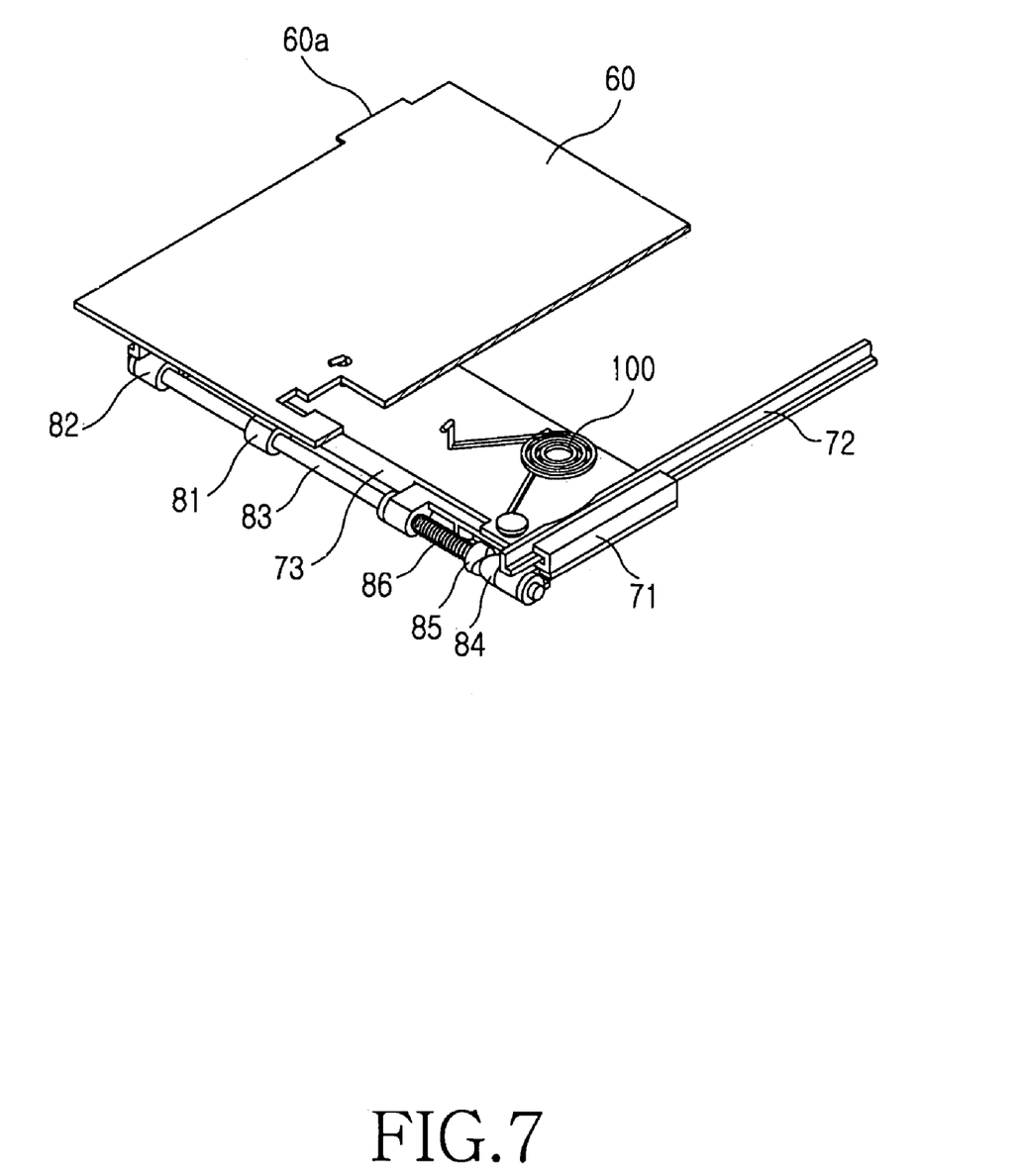
FIG. 7 is a perspective view showing the sliding type cradle subsequent to the sliding of the cradle according to the present invention.

As shown in FIGS. 6 and 7, the sliding guide 70 includes a pair of guide members 71 and a coupling member 73. The guide members 71 are formed on an upper surface of the sliding guide 70 and coupled to a pair of guide rails 72 formed on the second member 60 so as to slide. The coupling member 73 is formed at a center portion of the sliding guide 70 and is coupled to the first member 50 while facing the first member 50.

As shown in FIGS. 1 and 8 to 10, the hinge member 80 includes first and second hinge arms, 81 and 82 respectively, which are arranged in pair, a hinge rod 83, a hinge cam 84, a hinge shaft 85, a coil spring 86, and at least one washer 87. The first hinge arm 81 is formed at one end of the first member 50, which is engaged with the second hinge arm 82 and has a shaft hole through which the hinge rod 83 extends. The second hinge arm 82 is formed at one side of the sliding guide 70, which is engaged with the first hinge arm 81 and has a shaft hole through which the hinge rod 83 extends. The hinge rod 83 provides the hinge axis A1, which extends through the shaft hole so as to couple the first hinge arm 81 to the second hinge arms 82. The hinge cam 84 is mounted on the hinge rod 83 and has a concave portion 84a which includes a curved surface so as to face a convex portion of a hinge shaft 85 described below. The hinge shaft 85 includes the convex portion 85 having a curved surface, which is mounted on the hinge rod 83 so as to straightly move along the hinge rod 83 while facing the concave portion 84a of the hinge cam 84. The coil spring 86 presses the other end of the hinge shaft 85 by means of one end thereof so that the convex portion 85a comes into sliding contact with the concave portion 84a and the hinge shaft 85 straightly moves. The washers 87 is coupled to the hinge rod 83 so as to prevent the hinge rod 83 from being separated from each of the hinge arms 81 and 82.

Figure 11:
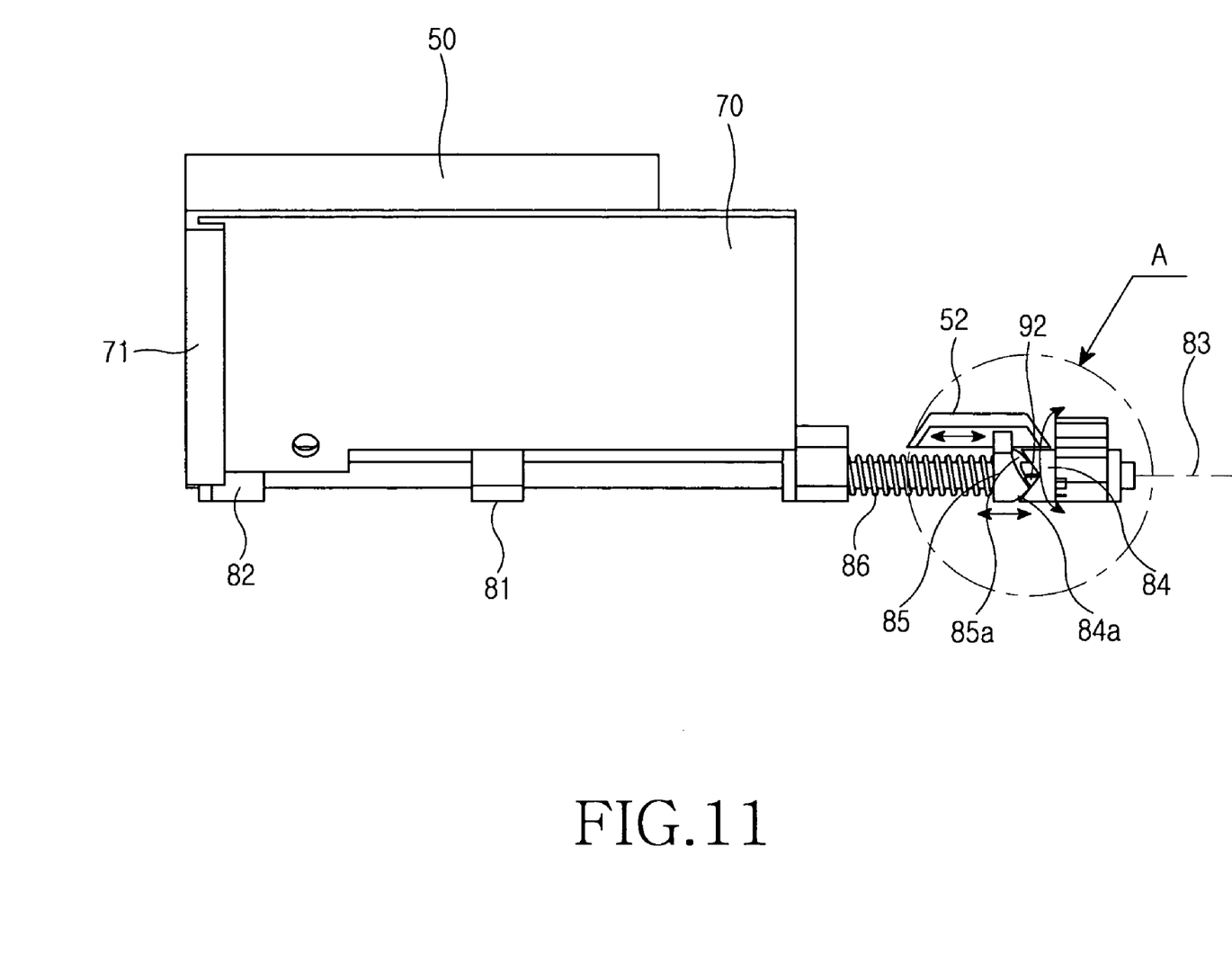
FIG. 11 is a plane view showing the portable terminal and the sliding type cradle for the same according to the present invention, in which the operation of a rotating member is shown.
Figure 12:
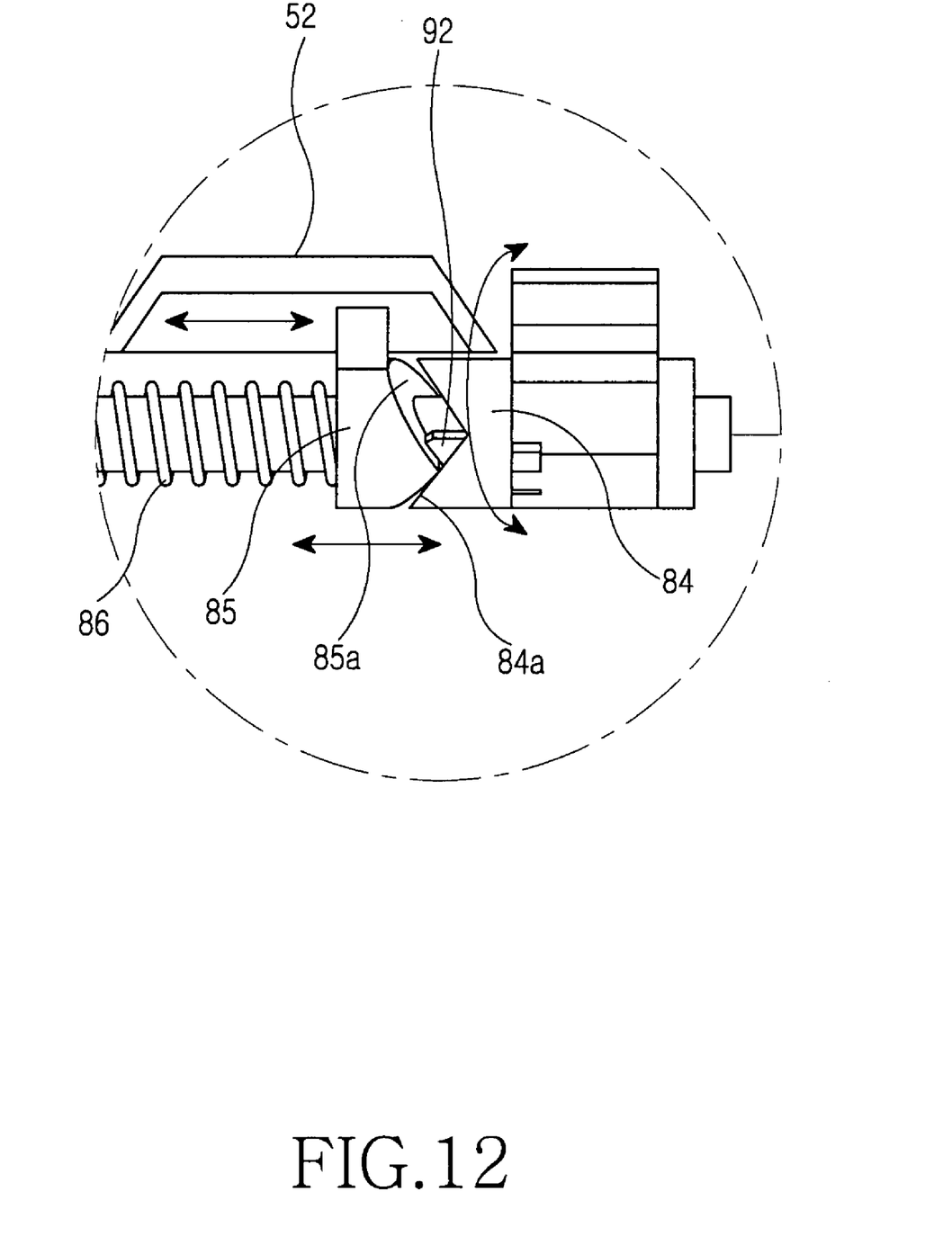
FIG. 12 is an enlarged sectional view showing the rotating member marked by circle A in FIG. 11.

As shown in FIGS. 11 and 12, the first member 50 and the sliding guide 70 have stoppers in order to restrict the rotation of the second housing 30. The stopper includes first and second stoppers.

Figure 13:
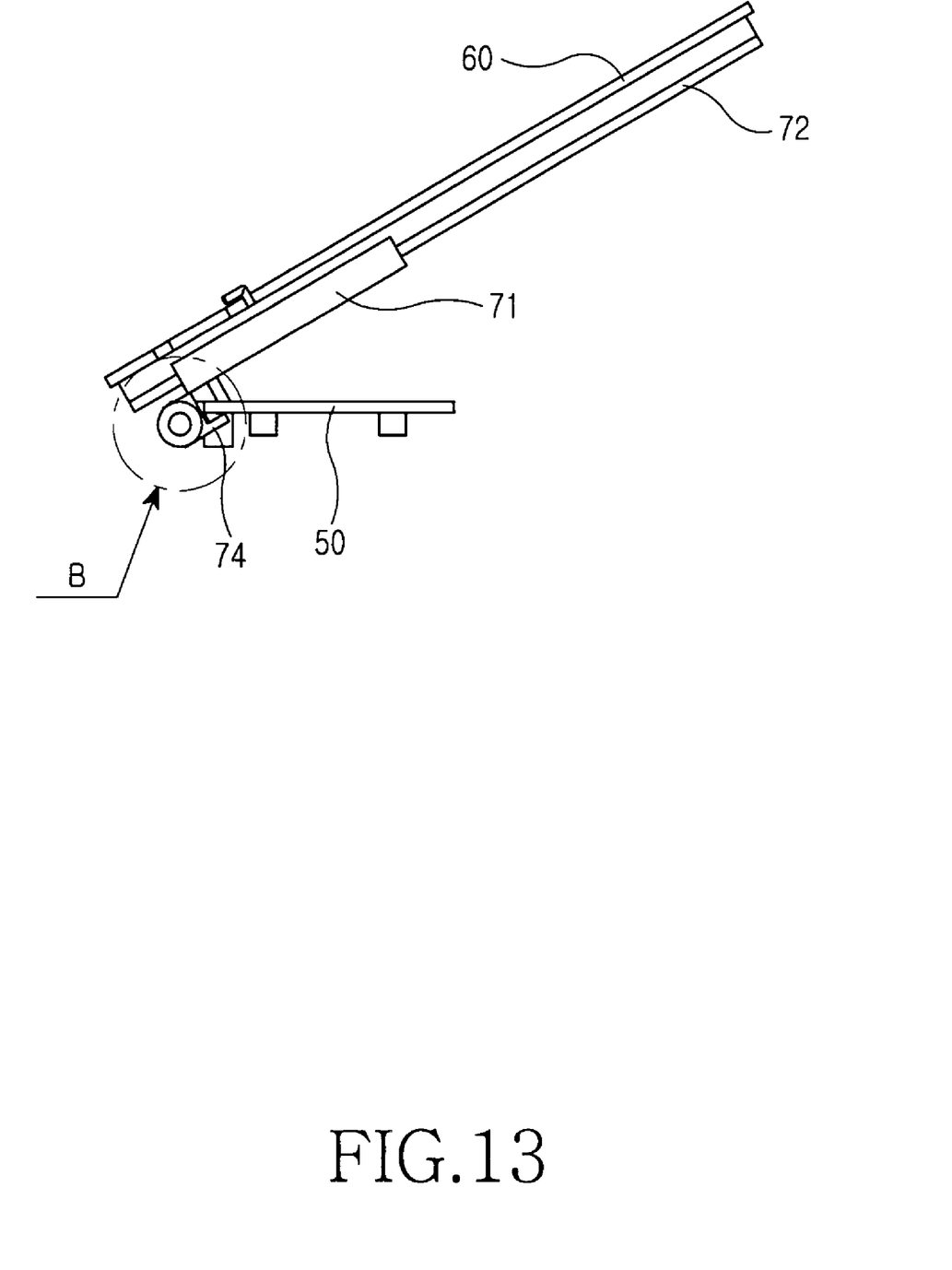
FIG. 13 is a side view showing the portable terminal and the sliding type cradle for the same according to the embodiment of the present invention, in which the cradle is rotated.
Figure 14:
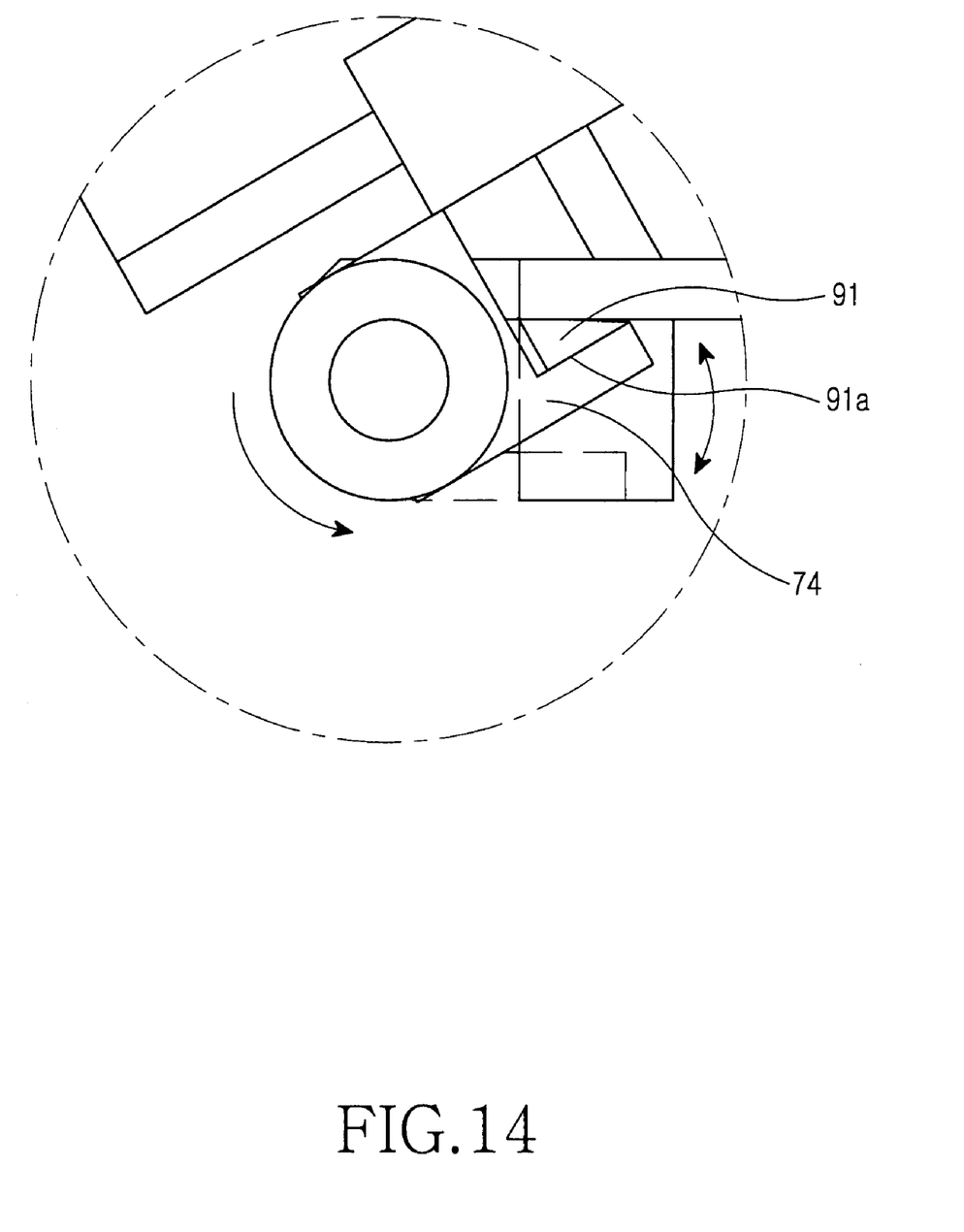
FIG. 14 is an enlarged view showing a portion marked by a circle B in FIG. 13.

As shown in FIGS. 13 and 14, the first stopper 91 is provided to the first member 50 so as to restrict the rotation of the second housing 30 in such a manner that the first member comes into contact with the second arm 82 which is formed on and rotates along with the sliding guide 70 while the second member 60 and the sliding guide 70 rotate along with the second housing 30.

As shown in FIGS. 11 and 12, the second stopper 92 is provide to the hinge cam 84 so as to restrict the rotation of the second housing 30 by a desired angle in such a manner that the hinge cam 84 rotates and comes into contact with the convex portion 85a of the hinge shaft 85 when the second hinge arm of the sliding guide 70 rotates along with the second housing 30. The rotation angle of the second housing 30 is about 30 degrees.

In FIG. 14, the first stopper 91 has an incline surface 91a so as to come into contact with the second hinge arm 82 of the sliding guide 70.

As shown in FIG. 11, the first member 50 has a cam guide 52 which receives the cam protrusion 85b formed on the hinge shaft 85a while guiding the straight movement of the hinge shaft 85.

As shown in FIG. 4, the first housing 20 has a supporting member 400 formed thereon, which is coupled to the supporting protrusion 60a formed on the second member 60 so as to support the first housing 20 before the second housing 30 movably slides.

Hereinafter, the operation of the portable terminal and the sliding type cradle for the same according to the present invention, which have the above-mentioned structure, will be described in detail with reference to the accompanying drawings.

As shown in FIGS. 1 to 3, the sliding type cradle 40 of the portable terminal includes the first and second housings 20 and 30, respectively the first and second members 50 and 60, respectively the sliding guide 70, and the hinge member 80.

As shown in FIG. 3, the first housing 20 has the mounting surface 22 formed at a desired depth thereon. The mounting surface 22 has a space in which the second housing 30 rotates after finishing its sliding movement. The mounting surface 22 is divided into the first and second regions 202 and 203. The first region 202 of the mounting surface 22 has screw coupling members 22a formed therein, while the second region 203 has the first keys 21a. The first keys 21a are arranged in 3×4 matrices.

As shown in FIGS. 1 and 2, the first member 50 and the sliding guide 70 are coupled so as to face each other. At this time, the a pair of first hinge arms 81 formed on the first member 50 is coupled to the second hinge arms 82 formed on the sliding guide 70 so as to rotate along with the second hinge arms 82. Specifically, the first and second hinge arms 81 and 82, respectively are coupled to each other so that the their shaft holes are aligned with each other, while the hinge rod 83 of the hinge member 80 is inserted into the aligned shaft holes. The hinge cam 84, the hinge shaft 85, the coil spring 86, and at least one washers 87 are mounted on the hinge rod 83 in order to rotate the second housing 30.

As shown in FIG. 2, as the sliding guide 70 has the coupling member 73 formed at a center portion thereof, in order to couple the first member 50 to the sliding guide 70 while they face each other, the coupling member 73 is disposed between and couples the first hinge arms 81 of the first member 50 to each other.

In this state, as shown in FIG. 3, the first member 50 is fixedly coupled to the screw coupling member 22a of the first housing 20 by means of screws (not shown).

As shown in FIGS. 1 and 2, the guide rail 72 formed on the second member 60 is coupled to the pair of guide members 71 formed on the sliding guide 70 so as to movably slide along the guide members 71. At this time, the force supplying member 100 is provided between the second member 60 and the sliding guide 70, so as to supply force for closing the second housing by a predetermined distance, while supplying force for opening the second housing outside more than the predetermined distance. The force supplying member includes an elastic body.

As shown in FIG. 1, the elastic body 100 has one end 101 fixed to the sliding guide 70, and the other end coupled to the second member 60. In this state, the second member 60 is fixed to the second housing 30.

As shown in FIG. 4, the first housing 20 has the supporting member 400 which is coupled to the supporting protrusion 60a formed on the second member 60 so as to support the second housing 30 fixed to the first housing 30 before the second housing 30 movably slides. Therefore, the supporting protrusion 60a formed on the second member 60 is hung and supported by the supporting member 400 formed on the first housing when the second member 60 is mounted on the first housing 20.

As shown in FIGS. 4 to 10, in a case where a user views images using the portable terminal 10, the user slides the second housing in the space recessed in the first housing 20 and then the second housing 30 automatically rotates about a location, where the sliding movement thereof terminates, on the first housing 20 so as to slantingly cradle the display unit 31.

As shown in FIG. 6, the second housing 30 movably slides on the mounting surface 22 of the first housing 20 while opening and closing the first keys 21a provided on the first housing 20.

As shown in FIG. 7, the second member 60 fixed to the second housing 30 movably slides along with the second member 60. Further, since the pair of the rails 72 are formed on the second member 60 movably slides along with the pair of the guide member 71 formed on the sliding guide 70, the second member 60 can be slid by means of the pair of guide members 71. The second housing 30 and the second member 60 can be movably slid by means of the elastic body 100.

Figure 9:
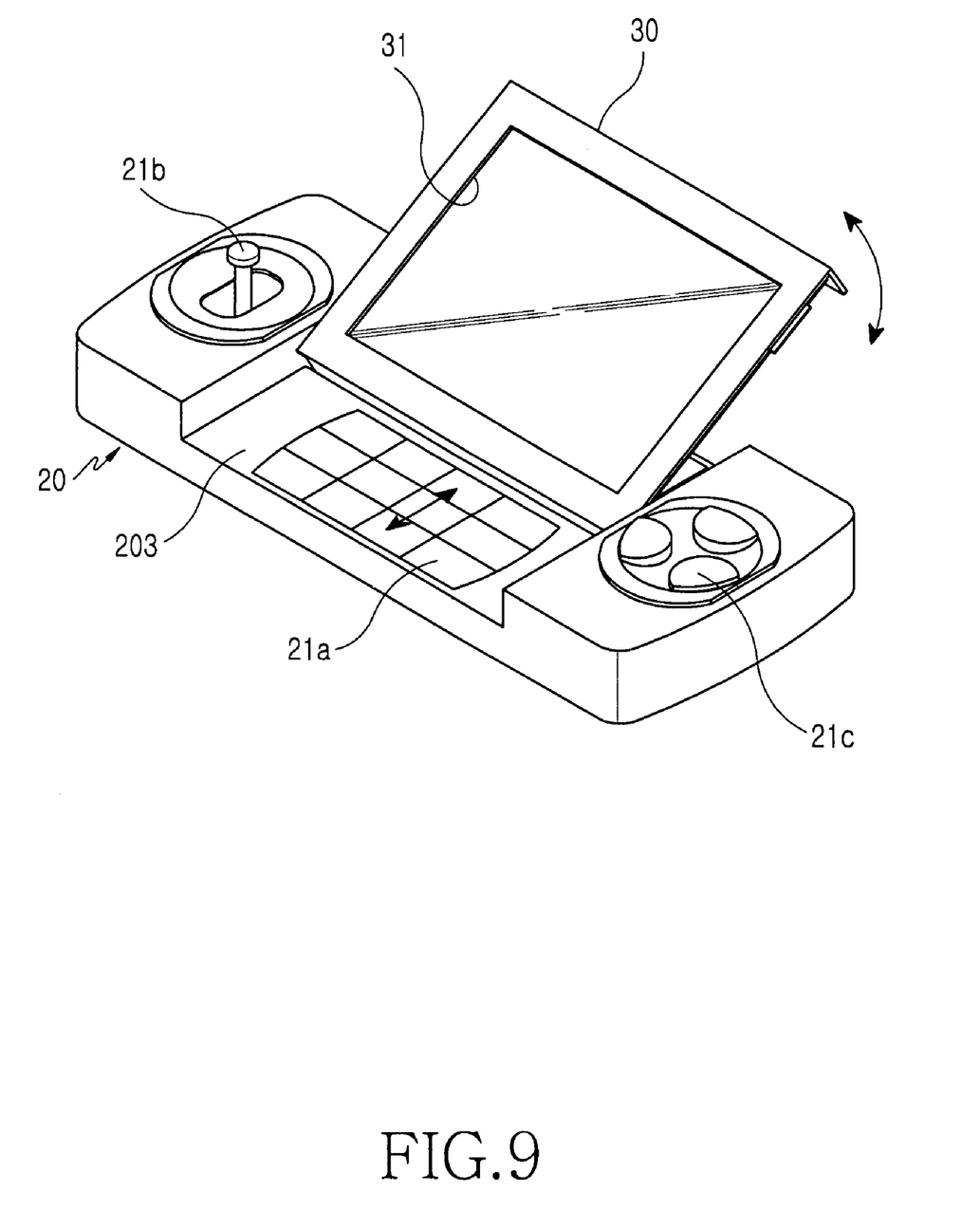
FIG. 9 is a perspective view showing the portable terminal and the sliding type cradle for the same according to the present invention, in which they are rotated.
Figure 10:
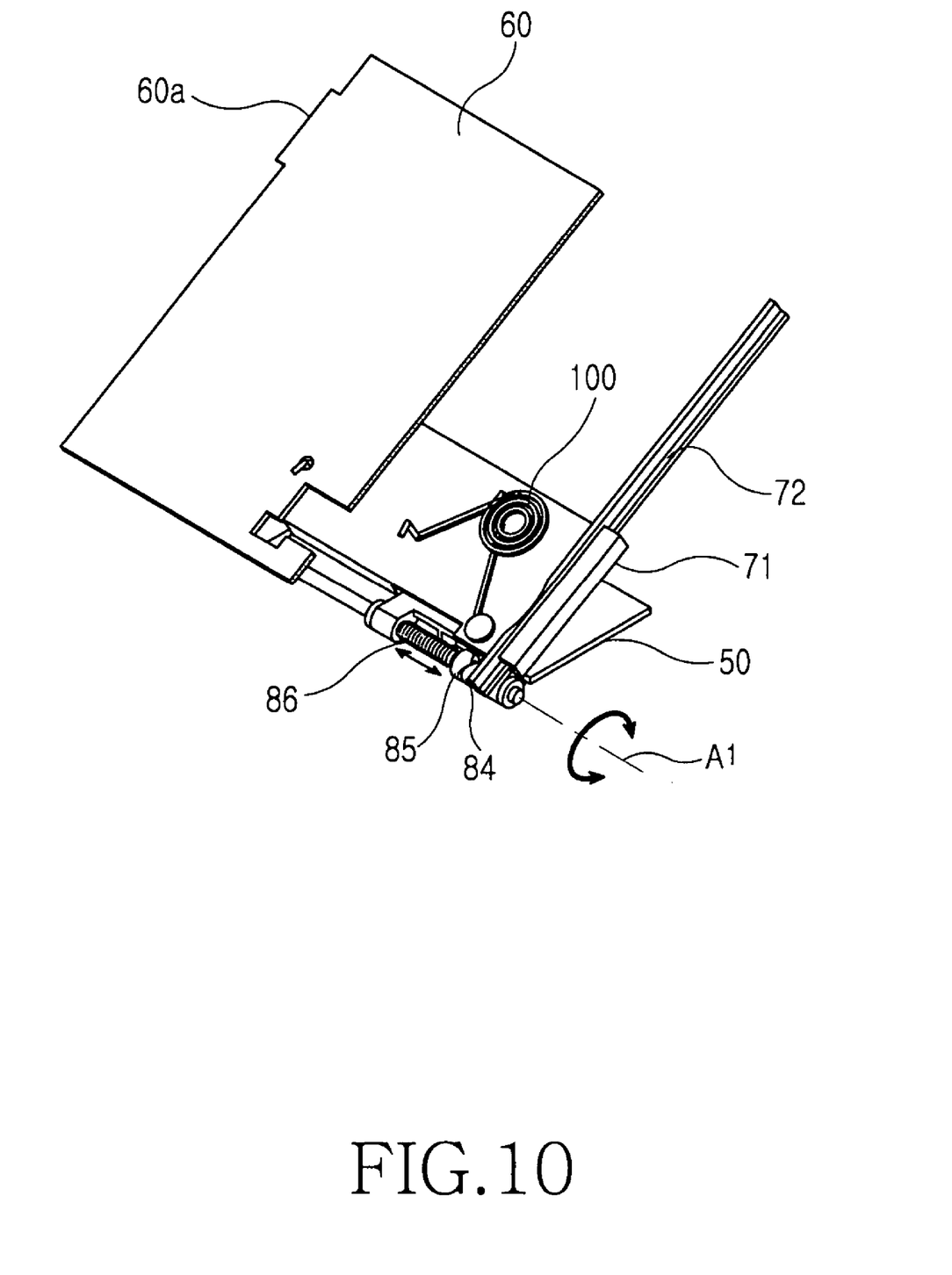
FIG. 10 is a perspective view showing the sliding type cradle in a rotated state according to the present invention.

At this time, as shown in FIGS. 9 and 10, the second housing 30 automatically rotates along with the second member 60 at a location where the sliding movement is completed. The sliding guide 70 also rotates along with the second housing 30. The second housing 30 can be rotated around the hinge axis A1 by means of the hinge member 80 formed at one end of the sliding guide 70 and the first member 50.

At this time, the supporting protrusion 60a formed on the second member 60 is separated from the supporting member 400 formed on the first housing 30, so as to enable the second housing 30 to rotate.

As shown in FIG. 8, the guide rotation groove 202a is formed in the first region 202 of the mounting surface 22 and guides the second housing 30 so that the second housing 30 movably slides along the upper surface of the second region 203 while automatically rotating at a location where the movement of the second housing 30 is completed. Therefore, when the second housing 30 reaches the location where it movably slides along the upper surface of the second region 203 on the mounting surface 22, the second housing 30 is guided along the guide rotation groove 202a and then automatically rotated.

As shown in FIGS. 11 and 12, as the sliding guide 70 rotates, the hinge cam 84 mounted on the hinge rod 83 simultaneously rotates. At this time, the hinge shaft 85 facing the hinge cam 84 straightly moves along the hinge rod 83. The hinge cam 84 has the concave portion 84a formed on a surface thereof and having a curved surface, while the hinge shaft 85 has the convex portion 85a formed at one end thereof while facing the curved surface of the concave portion 84a. Therefore, when the sliding guide 70 rotates, the hinge cam 84 rotates so that the concave portion 84a of the hinge cam 84 rotates along the convex portion 85a of the hinge shaft 85 while coming into sliding contact with the convex portion 85. On the other hand, since the hinge shaft 85 is provided with the coil spring 86 at the other end thereof, the hinge shaft 85 is straightly moved and pressed by means of the coil spring 86 so that the convex portion 85a pushes the concave portion 84a so as to automatically rotate the hinge cam 84.

As shown in FIGS. 11 and 12, the second stopper 92, which contacts with the convex portion 85a of the hinge shaft 85 so as to restrict the rotation of the second housing 30 to the desired angle when the sliding guide 70 rotates along with the second hinge arm 82 and the hinge cam 84 automatically rotates, is formed on the hinge cam 84. The second stopper 92 contacts with the convex portion 85a of the hinge shaft 85 so as to restrict the rotation of the second housing 30 to the desired angle as the hinge cam 84 rotates. The rotation angle of the second housing 30 is about 30 degrees.

Here, as shown in FIGS. 13 and 14, the first member 50 has the first stopper 91 to restrict the rotation of the second housing 30. When the second housing 30 rotates, the stopper protrusion 74 formed on the sliding guide 70 automatically rotates along the second housing 30 and contacts with the first stopper 91 so as to rotate the second housing 30. The first stopper 91 has an inclined surface 91a formed at a side thereof in order to restrict the second housing 30 to being in an inclined status. In this state, after the portable terminal 10 is cradled on a bottom surface of the cradle, the user can view TV and moving picture.

Further, as shown in FIG. 8, in the case of using the portable terminal 10 in a game mode, after the portable terminal 10 is cradled on the bottom surface of the cradle, the user can use the second and third keys 21b and 21c provided to the first housing 20. The second keys 21b include the joystick keys, and the third keys 21c include keys for games.

As described above, since the display unit of the portable terminal is mounted on the housing and movably slides while capable of being raised to a desired angle, it is possible for a user to conveniently view TV and moving pictures using the cradle, and to reduce the volume and thickness of the portable terminal so as to realize the miniaturization of the portable terminal.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal comprising:
   a first housing having a recess formed at a desired depth on an upper surface of the first housing, and including at least one speaker unit and a plurality of keys;
   a second housing including a display unit, and sliding while facing the first housing from a first flat position to a second flat position; and
   a cradle coupling the second housing to the first housing, the cradle automatically rotating the second housing at the end of the sliding from the second flat position to a predetermined slant position.

2. The portable terminal as claimed in claim 1, wherein the first housing further has a mounting surface formed at a desired depth therein in order to mount the second housing while facing the first housing.

3. The portable terminal as claimed in claim 1, wherein the plurality of keys include first, second, and third keys, in which the first keys are arranged on the mounting surface so as to be opened and closed during the sliding movement of the second housing, while the second and third keys are arranged adjacent to the mounting surface.

4. The portable terminal as claimed in claim 3, wherein the first keys are arranged in 3×4 matrices, the second keys include joystick keys, and the third keys are used as game keys.

5. A sliding type cradle for a portable terminal having a first housing, and a second housing sliding on the first housing from a first flat position to a second flat position, the cradle comprising:
   a first member mounted in a recess formed at a desired depth in the first housing;
   a second member coupled to the second housing;
   a sliding guide disposed between the first and second members, for guiding a sliding movement of the second housing; and
   hinge means disposed between the first member and the sliding guide, the sliding type cradle automatically rotating the second housing at the end of the sliding from the second flat position to a predetermined slant position.

6. A sliding type cradle for a portable terminal as claimed in claim 5, wherein the sliding guide further includes force supply means which supplies force so as to close the sliding guide within a desired distance while supplying force so as to open the sliding member over the desired distance.

7. A sliding type cradle for a portable terminal as claimed in claim 6, wherein the force supply means includes an elastic body of which one end is fixed to the sliding guide while the other end is fixedly coupled to the second member, so as to move along a certain orbit during the sliding movement of the second housing.

8. A sliding type cradle for a portable terminal as claimed in claim 5, wherein the first housing has a mounting surface formed at a desired depth, which is divided into first and second regions, the first region having a plurality of screw coupling members which are screwed in a plurality of screw holes formed in the first member, and the second region including a plurality of the keys.

9. A sliding type cradle for a portable terminal as claimed in claim 8, wherein the second region protrudes and forms a step portion over the first region, while the first region further has a rotating groove formed to automatically guide the rotation of the second housing when the second housing finishes its sliding movement along the second region in an upper surface of the first housing.

10. A sliding type cradle for a portable terminal as claimed in claim 8, wherein the plurality of the screw holes is formed on a surface of the first member, and coupled to the screw coupling members.

11. A sliding type cradle for a portable terminal as claimed in claim 5, wherein the second member further has an opening through which a flexible circuit extends from the second housing to the first housing, so that the flexible circuit is connected to the first housing.

12. A sliding type cradle for a portable terminal as claimed in claim 5, wherein the sliding guide includes a pair of guide members which are coupled to a pair of guide rails formed on the second member so as to slide, on an upper surface of the sliding guide, and a coupling member formed at a center portion of the sliding guide and coupled to the first member while facing the first member.

13. A sliding type cradle for a portable terminal as claimed in claim 12, wherein the hinge means includes a pair of first hinge arms formed at one end of the first member, a pair of second hinge arms formed at a side of the guide members, a hinge rod providing the hinge axis, and extending through a shaft hole after the first and second hinge arms are coupled to the hinge rod, a hinge cam through which the hinge rod extends through, and which is coupled to the second hinge arm and has a concave portion on a surface of the hinge cam, a hinge shaft through which the hinge rod extends and which is mounted to straightly move on the hinge rod, of which one end includes a convex portion facing the concave portion, a coil spring having one end for pressing the other end of the hinge shaft so that the hinge shaft moves straightly while the convex portion is engaged with the concave portion, and at least one washer coupled to the hinge rod so as to prevent the hinge arm from being separated from the hinge rod.

14. A sliding type cradle for a portable terminal as claimed in claim 13, wherein the first member and the sliding guide further include a stopper for restricting rotation of the second housing.

15. A sliding type cradle for a portable terminal as claimed in claim 14, wherein the stopper includes a first stopper provided to the first member and rotating along with a stopper protrusion formed on the sliding guide while coming into contact with the stopper protrusion so as to restrict the rotation of the second housing when the sliding guide rotates along with the second member during the rotation of the second housing, and a second stopper provided to the hinge cam which rotates along with the second hinge arms so as to come into contact with the convex portion when the second hinge arms of the sliding guide rotate during the rotation of the second housing, thereby restricting the rotation of the second housing by a desired angle.

16. A sliding type cradle for a portable terminal as claimed in claim 15, wherein the first stopper further has an inclined surface.

17. A sliding type cradle for a portable terminal as claimed in claim 13, wherein the first member further includes a cam guide for receiving a cam protrusion formed on the hinge shaft while guiding the straight movement of the hinge shaft.

18. A sliding type cradle for a portable terminal as claimed in claim 5, wherein the first housing further includes a supporting member which is coupled to a supporting protrusion formed on the second member so as to support the first housing with respect to the second housing before the sliding movement of the second housing occurs.

* * * * *